(12) United States Patent
Joshi et al.

(10) Patent No.: US 10,810,164 B2
(45) Date of Patent: Oct. 20, 2020

(54) SECURING ACCESS TO FUNCTIONALITY OF A FILE-BASED WRITE FILTER

(71) Applicant: Wyse Technology L.L.C., Santa Clara, CA (US)

(72) Inventors: Salil S Joshi, Fremont, CA (US); Puneet Kaushik, Fremont, CA (US); Sumit Popli, Campbell, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 592 days.

(21) Appl. No.: 15/418,074

(22) Filed: Jan. 27, 2017

(65) Prior Publication Data
US 2018/0217996 A1    Aug. 2, 2018

(51) Int. Cl.
| G06F 16/176 | (2019.01) |
| G06F 21/00 | (2013.01) |
| G06F 21/62 | (2013.01) |
| G06F 21/79 | (2013.01) |
| G06F 16/17 | (2019.01) |

(52) U.S. Cl.
CPC ...... *G06F 16/1774* (2019.01); *G06F 16/1734* (2019.01); *G06F 21/00* (2013.01); *G06F 21/6218* (2013.01); *G06F 21/79* (2013.01)

(58) Field of Classification Search
CPC .. G06F 21/00; G06F 16/1734; G06F 21/6218; G06F 21/79; G06F 16/1774
USPC ........................................................ 707/783
See application file for complete search history.

(56) References Cited

U.S. PATENT DOCUMENTS

| 9,165,078 B2 * | 10/2015 | Bester ................. G06F 16/2282 |
| 9,405,602 B1 * | 8/2016 | Verne ...................... G06F 9/547 |
| 10,102,080 B1 * | 10/2018 | Gruszka .............. G06F 11/1464 |
| 2002/0069245 A1 * | 6/2002 | Kim ....................... G06F 3/0605 709/203 |
| 2005/0171977 A1 * | 8/2005 | Osborne ............. G06F 11/3447 707/999.107 |
| 2005/0289469 A1 * | 12/2005 | Chandler ........... H04N 21/8126 715/745 |
| 2007/0101079 A1 * | 5/2007 | Macintyre ........... G06F 12/0804 711/163 |
| 2011/0277013 A1 * | 11/2011 | Chinta .................... G06F 21/54 726/1 |
| 2014/0280248 A1 * | 9/2014 | Bester ..................... G06F 16/23 707/754 |
| 2015/0124678 A1 * | 5/2015 | Asterjadhi ........ H04W 52/0219 370/311 |
| 2016/0036833 A1 * | 2/2016 | Ardeli ................... H04L 63/101 726/22 |
| 2016/0203085 A1 * | 7/2016 | Kranich .............. G06F 12/0877 713/2 |

(Continued)

*Primary Examiner* — Phong H Nguyen
(74) *Attorney, Agent, or Firm* — Kirton McConkie; Brian Tucker

(57) ABSTRACT

Access to functionality of a file-based write filter can be secured. A policy-based filter can be configured to monitor and filter calls to APIs that access functionality of the file-based write filter. Based on policy, the policy-based filter can selectively block such calls to ensure that only permitted applications and/or users are allowed to access the functionality of the file-based write filter. In some cases, the policy-based filter can be configured to communicate with a server component to determine whether a particular attempt to access the functionality of the file-based write filter should be allowed.

20 Claims, 12 Drawing Sheets

(56) References Cited

U.S. PATENT DOCUMENTS

2016/0306643 A1\* 10/2016 Klee ..................... G06F 3/0689
2017/0103647 A1\* 4/2017 Davis ................ H04W 12/0802

\* cited by examiner

SECURING ACCESS TO FUNCTIONALITY OF A FILE-BASED WRITE FILTER

CROSS-REFERENCE TO RELATED APPLICATIONS

N/A

BACKGROUND

The Windows Embedded operating system includes functionality that can prevent the content of a storage medium from being changed. In a typical example, it may be desirable to prevent the operating system image, which may be stored on a particular disk partition or on flash media, from being changed at runtime. To accomplish this, Windows Embedded provides a file-based write filter which operates at the file level and a block-based write filter (or enhanced write filter) which operates at the block level to redirect all writes that target a protected volume to a RAM or disk cache called an overlay. This overlay stores changes made to the operating system at runtime but is removed when the device is restarted thereby restoring the device to its original state.

FIG. 1 illustrates how a file-based write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, file-based write filter 110 is positioned at the top of the driver stack and will therefore be able to process an IRP prior to the IRP being passed down to the lower level drivers. File-based write filter 110 can be configured to detect writes targeting a protected volume and redirect them to overlay 140 rather than allowing them to be passed down the driver stack. As a result, the write will actually occur in overlay 140 rather than to disk 100. File-based write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

Even when file based write filter 110 is employed, it may still be desirable to allow certain files to be modified on disk 100. To enable this, file-based write filter 110 includes an exclusion list which identifies any file or directory that file-based write filter 110 should allow to be modified. An application can add a file or directory to this exclusion list using write filter APIs 150 (e.g., the APIs of fbwflib.lib). For example, the FbwfAddExclusion function allows an application to specify a file or directory to be excluded. When file-based write filter 110 receives a write request that targets a file or directory that is included in the exclusion list, it will allow the write request to proceed down the driver stack in a normal fashion such that the write will occur on disk 100. Similarly, even if a file has been redirected to overlay 140, an application may employ the FbwfCommitFile function to cause the file in overlay 140 to be persisted to disk 100. Further, the FbwfDisableFilter and FbwfUnprotectVolume functions can be called to disable file-based write filter 110 entirely or for a specified volume respectively. Any application that obtains administrator privileges can employ the functionality exposed by write filter APIs 150 to make undesired changes to the operating system and thereby compromise security. This creates a loophole in an otherwise secure operating system.

BRIEF SUMMARY

The present invention extends to methods, systems, and computer program products for securing access to functionality of a file-based write filter. A policy-based filter can be configured to monitor and filter calls to APIs that access functionality of the file-based write filter. Based on policy, the policy-based filter can selectively block such calls to ensure that only permitted applications and/or users are allowed to access the functionality of the file-based write filter. In some cases, the policy-based filter can be configured to communicate with a server component to determine whether a particular attempt to access the functionality of the file-based write filter should be allowed.

In one embodiment, the present invention is implemented as a method for securing access to functionality of a file-based write filter. A policy-based filter can intercept an attempt to access functionality of a file-based write filter and evaluate the access attempt against policies. When the policies indicate that the access attempt is not authorized, the policy-based filter can block the access attempt.

In another embodiment, the present invention is implemented as computer storage media storing computer-executable instructions which when executed implement a policy-based filter that secures access to functionality of a file-based write filter. The policy-based filter is configured to: intercept attempts to access functionality of the file-based write filter; identify an application that is the source of the access attempt; identify a current user; and allow the access attempt only if a policy indicates that the application and the current user are permitted to perform the access.

In another embodiment, the present invention is implemented as a method for blocking attempts to add exclusions to an exclusion list of a file-based write filter. A policy-based filter can intercept an attempt made by a first application to add an exclusion to an exclusion list of a file-based write filter. The policy-based filter can then access policies to determine whether the first application and a current user are allowed to add exclusions to the exclusion list. When the policies indicate that the first application and the current user are allowed to add exclusions to the exclusion list, the policy-based filter can allow the attempt to be passed to the file-based write filter.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "artifact" should be construed as encompassing files, directories, registry entries, or any other structure of a file system that can be modified via an I/O request. A "file-based write filter" should be construed as the File-based Write Filter (FBWF) that is included in the Windows Embedded operating system, any equivalent write filter that may be provided in future releases of Windows, or any write filter that performs equivalent functionality in other operating systems (i.e., redirecting writes targeting a protected volume to a separate, and possibly temporary, storage location). A "protected volume" should be construed as a volume storing artifacts that a file-based write filter protects from modification.

Figure 1:
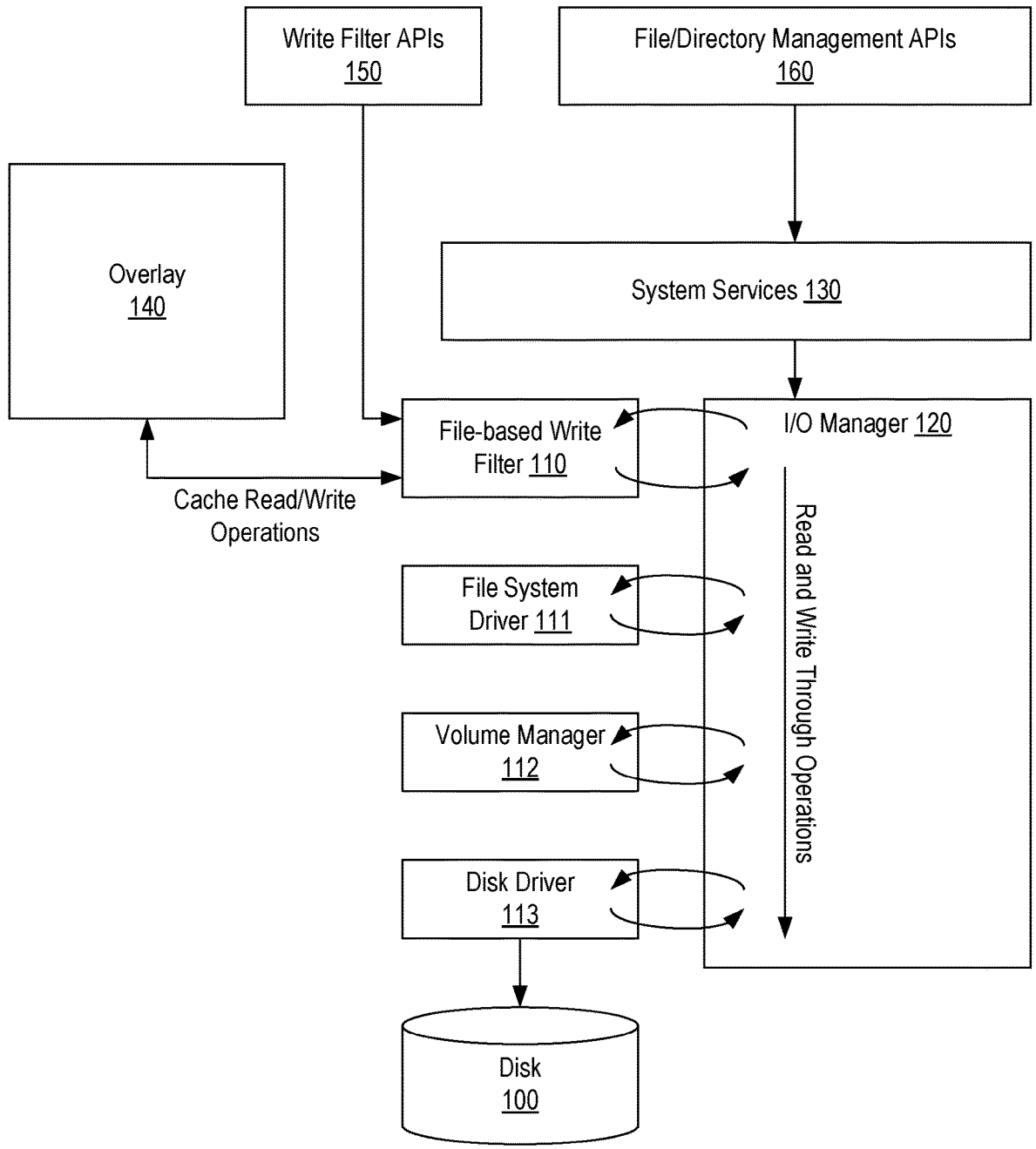
FIG. 1 illustrates a Windows-based I/O system in which a file-based write filter is employed to redirect writes targeting a protected volume to an overlay.
Figure 2:
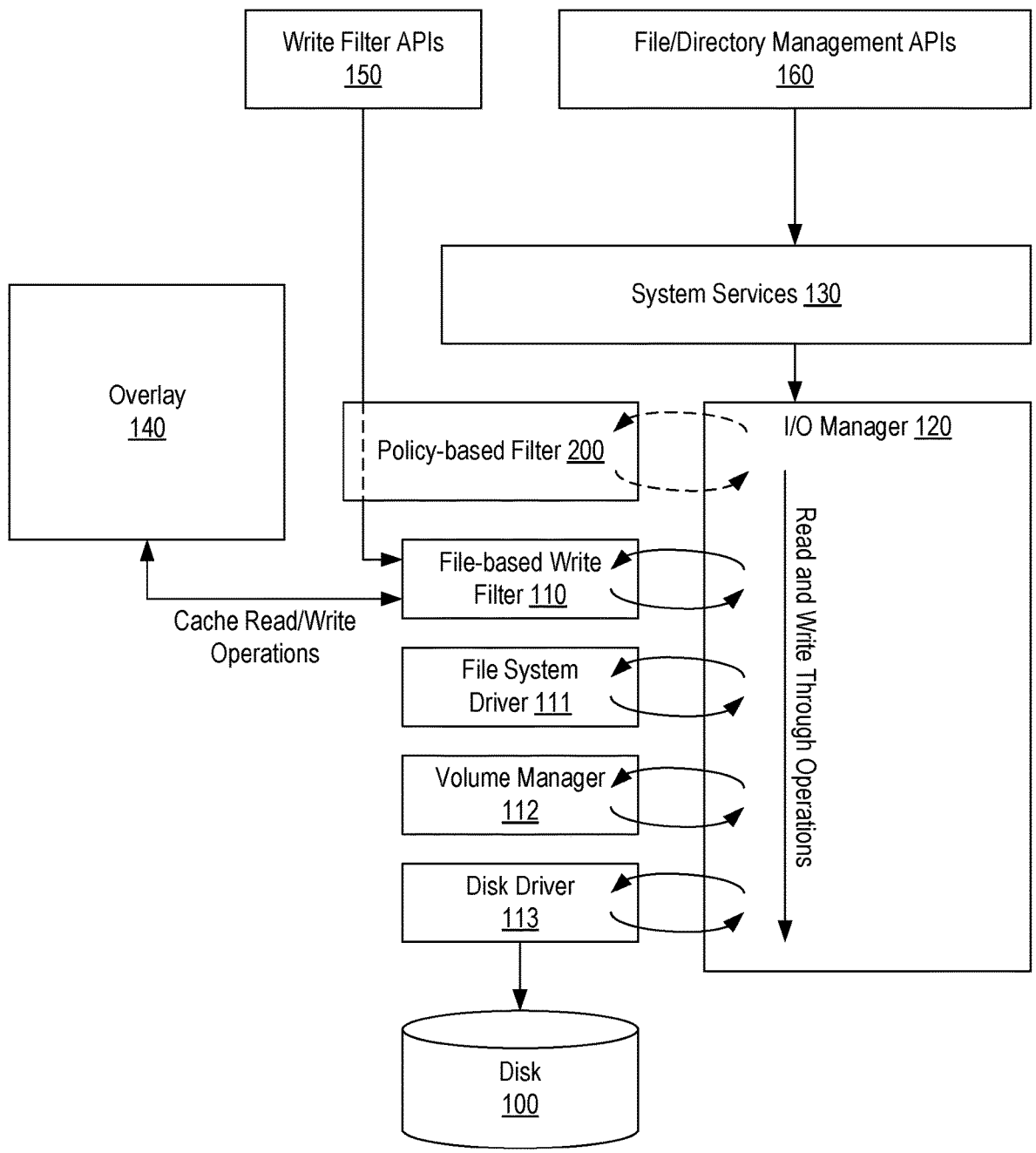
FIG. 2 illustrates the Windows-based I/O system of FIG. 1 with the addition of a policy-based filter that can be employed to monitor and filter attempts to access the functionality of the file-based write filter.

FIG. 2 illustrates how a policy-based filter 200 can be incorporated into the environment depicted in FIG. 1 to secure access to the functionality of file-based write filter 110. As shown, policy-based filter 200 can act as an intermediary between file-based write filter 110 and write filter APIs 150 (or any other components that may provide access to the functionality of file-based write filter 110). In this context, the term "intermediary" is intended to represent that policy-based filter 200 is configured to monitor attempts to access the functionality of file-based write filter 110 and can block such attempts when policy dictates. There are various ways in which policy-based filter 200 can function as an intermediary. For example, policy-based filter 200 could employ API hooking to intercept any call to a function of write filter APIs 150 that is desired to be monitored. The dashed line passing between write filter APIs 150 and file-based write filter 110 is intended to represent the use of API hooking. Alternatively, policy-based filter 200 could be configured as a filter driver that is attached to file-based write filter 110 such that any I/O requests targeting file-based write filter 110 (e.g., IOCTLs that are created when an application calls functions of write filter APIs 150) will be passed to policy-based filter 200 before being passed to file-based write filter 110. The dashed lines between policy-based filter 200 and I/O manager 120 are intended to represent this type of filtering.

Figure 3:
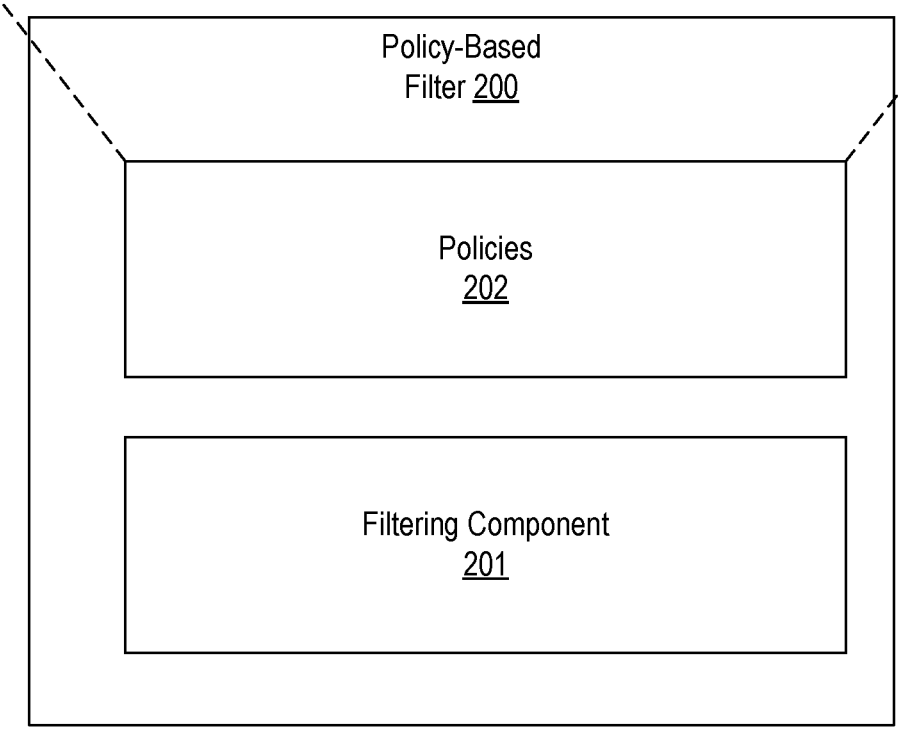
FIG. 3 illustrates an example of the components of the policy-based filter.

FIG. 3 provides a general example of the components of policy-based filter 200. These components can include a filtering component 201 which is intended to represent the portions of policy-based filter 200 that are configured to intercept attempts to access the functionality of file-base filter driver 110. Therefore, filtering component 201 can include functionality for performing API hooking and/or for attaching itself as a filter to file-based write filter 110. Filtering component 201 can also represent the portions of policy-based filter 200 that are configured to determine whether a particular attempt to access the functionality of file-based filter driver 110 should be allowed as well as the functionality for either allowing or blocking the attempt. For example, in the context of API hooking, filtering component 201 can be configured to allow a call to a function of write filter APIs 150 to proceed only if policies 202 allow the application and/or user that invoked the call to do so. Similarly, in the context of a filter driver, filtering component 201 can be configured to pass an IOCTL onto file-based write filter 110 only if policies 202 allow the application and/or user that are the source of the IOCTL to perform the functionality defined in the IOCTL.

FIG. 3 also provides a generalized example of how policies 202 can be configured. In this example, policies 202 are structured as a whitelist that defines which users can employ which applications to access specific functionality of file-based write filter 110. For example, policies 202 are shown as including an entry/rule of "User A can employ Application A to add an entry to the exclusion list." In other words, this entry indicates that filtering component 201 should allow a call to FbwfAddExclusion if the call is made by Application A when executed by User A. FIG. 3 also provides a number of other rules with varying levels of granularity. In essence, policies 202 can define the criteria by which filtering component 201 will determine whether a particular call to a function of write filter APIs 150 should be allowed.

Although FIG. 3 represents a case where policies 202 are structured as a whitelist, it is equally possible that policies 202 could be structured as a blacklist (e.g., by positively identifying which users and/or applications should be blocked from invoking a particular functionality). The content of policies 202 can be obtained/updated in a number of different manners including by hardcoding the content as part of installation, from ini or other files that are accessed when policy-based filter 200 is loaded, from a server or other external component, etc. Also, to prevent policies 202 from being improperly updated, in some embodiments, the content of policies 202 can be encrypted.

Figure 2A:
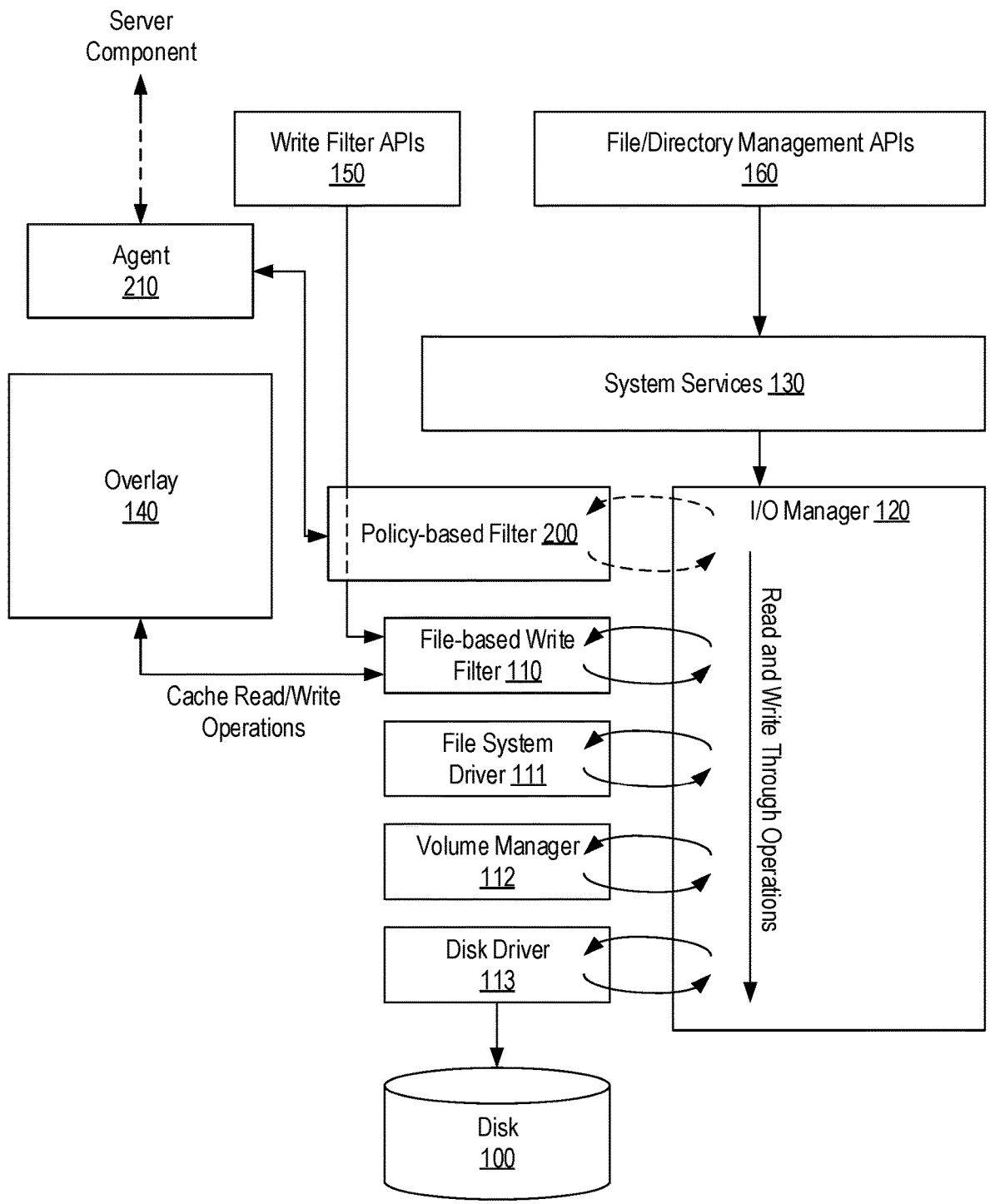
FIG. 2A illustrates the Windows-based I/O system of FIG. 2 with the addition of an agent by which the policy-based filter can communicate with a server component for the purpose of determining whether a particular attempt to access the functionality of the file-based write filter should be allowed.

In some embodiments, in addition to or in place of relying on policies 202, policy-based filter 200 may be configured to communicate with an external component in real-time for the purpose of determining whether a particular attempt to access the functionality of file-based write filter 110 should be allowed. FIG. 2A illustrates an example of how this may be accomplished. In FIG. 2A, an agent 210 is included in the computing environment (and can be a user mode component). In such cases, policy-based filter 200 can be configured to communicate with agent 210 when an attempt to access the functionality of file-based write filter 110 is intercepted. Agent 210 can be configured to communicate with a server component (e.g., a management service such as the Dell Wyse Device Manager or the Dell Cloud Client-Computing and Desktop Virtualization products) to verify whether the particular attempt should be allowed. In a specific example, and as will be further described below, the use of agent 210 to enable communication with the server component can allow policy-based filter 200 to employ time criteria when determining whether to allow or block an attempt to access the functionality of file-based write filter 110. In other words, the present invention can be configured to only allow the functionality of file-based write filter 110 to be updated within administrator-specified access windows even if policies 202 would otherwise allow the update. In cases where agent 210 is included, it can be tasked with maintaining and updating policies 202 based on input received from the server component or other source.

FIGS. 4A-4E provide an example of how policy-based filter 200 can control access to the functionality of file-based write filter 110. In this example, it will be assumed that an application 400 is attempting to add an exclusion to the exclusion list of file-based write filter 110 using the FbwfAddExclusion function. In current Windows implementations, a call to the FbwfAddExclusion function (or calls to other functions for accessing file-based write filter 110) will be handled by the FBWFlib component of the operating system. Accordingly, FIGS. 4A-4E include an FBWFlib component to represent how such calls will be processed.

Figure 4A:
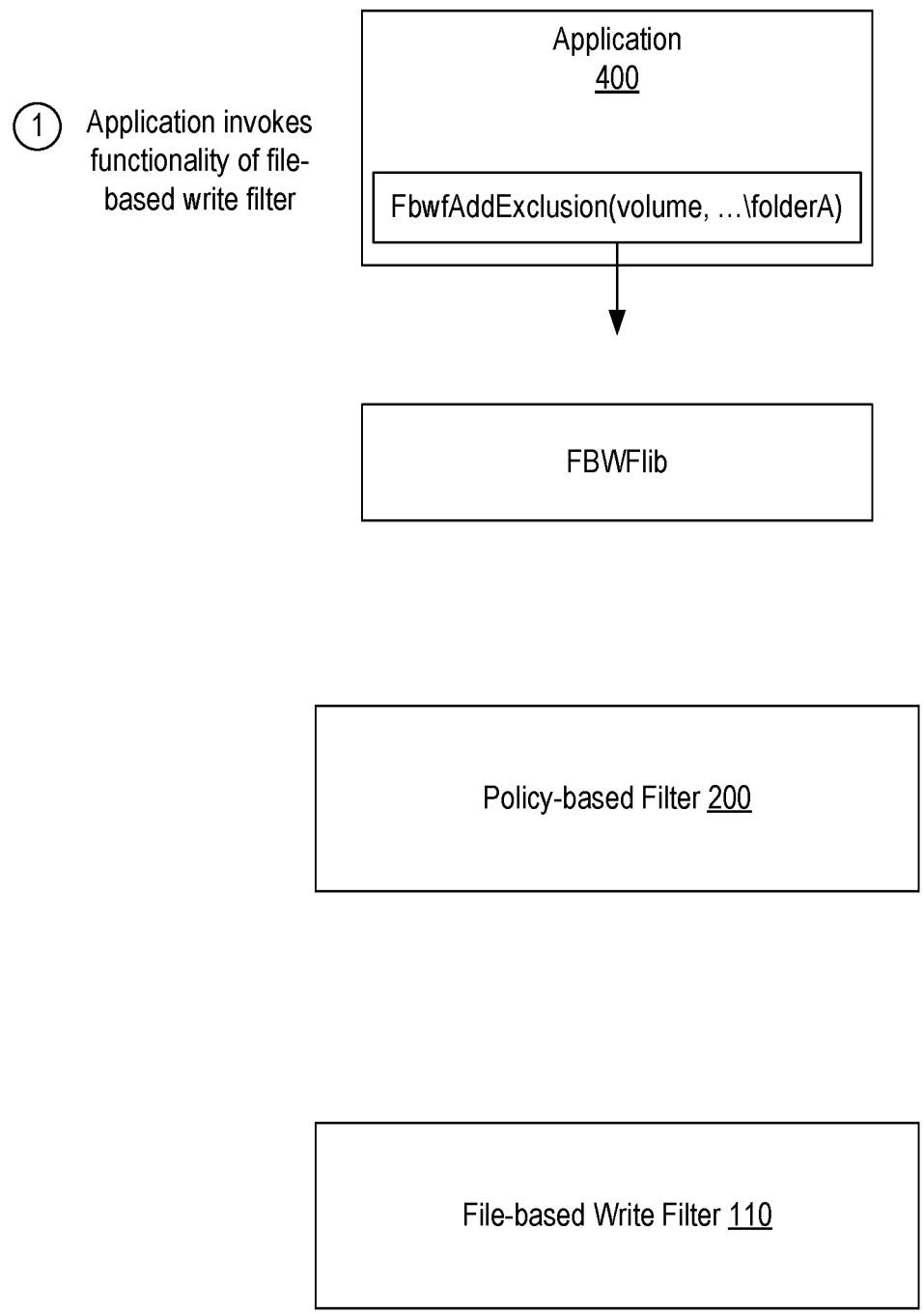
FIGS. 4A-4E provide an example of how a policy-based filter can control access to functionality of a file-based write filter.

In step 1 in FIG. 4A, it is assumed that application 400 invokes a call to FbwfAddExclusion which specifies that writes to the contents of folderA on a particular volume should not be redirected to overlay 140. Application 400 can represent any application capable of invoking any of write filter APIs 150 including possibly the File-based write filter (FBWF) Manager command line tool that is provided as part of the operating system.

Figure 4B:
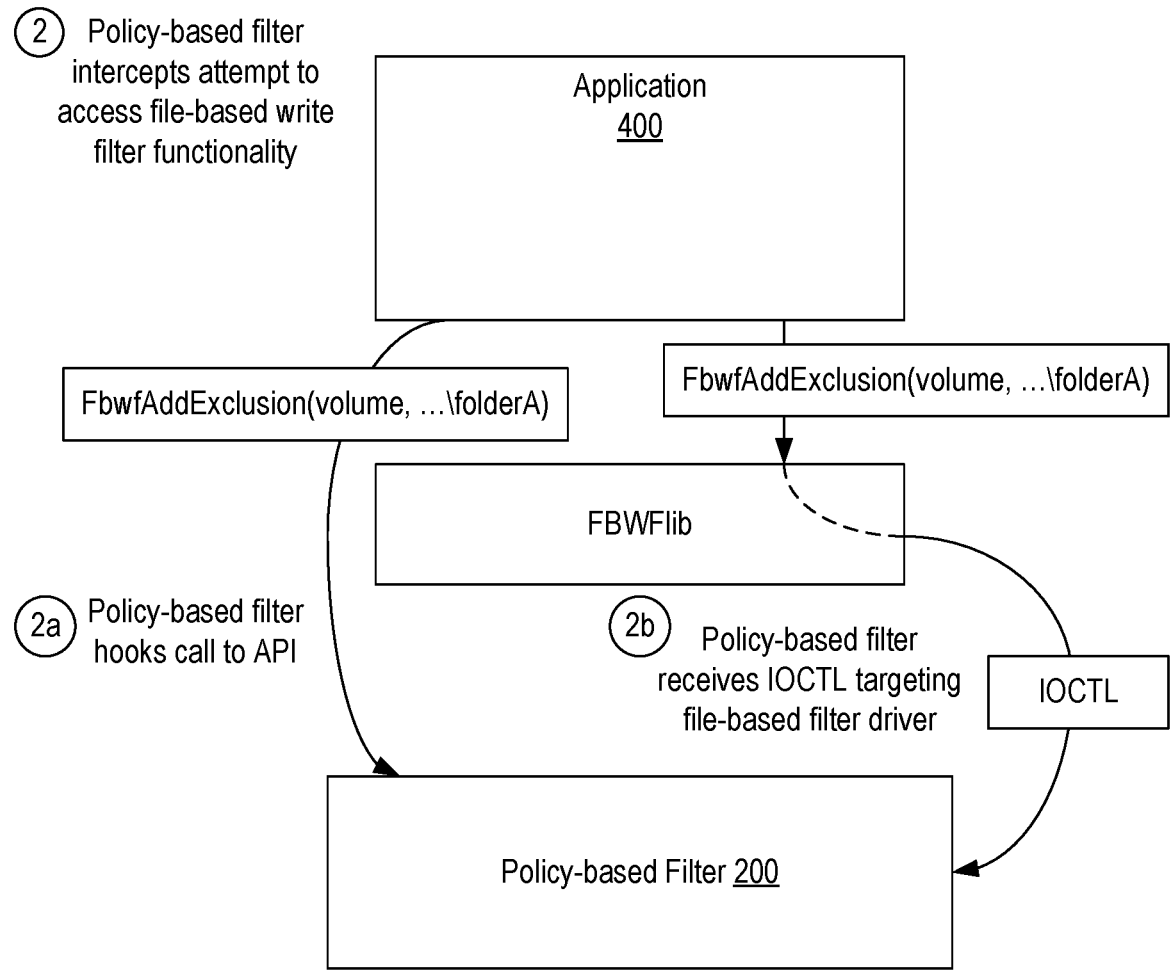

Next, in step 2 shown in FIG. 4B, policy-based filter 200 will intercept this attempt to access the functionality of file-based write filter 110. The exact manner in which this might occur will depend on how policy-based filter 200 is configured. For example, in cases where policy-based filter 200 is configured to perform API hooking, the operating system may notify policy-based filter 200 that the FbwfAddExclusion function was called prior to allowing the FBWFlib component to handle the call as is represented in step 2a. On the other hand, in cases where policy-based filter 200 is attached to file-based write filter 110 as a filter driver, policy-based filter 200 can receive an IOCTL that is generated by the FBWFlib component in response to the call to the FbwfAddExclusion function as shown in step 2b. For clarity, it is noted that the IOCTL would be in the form of an IRP with a particular IOCTL control code that is passed to policy-based filter 200 by I/O manager 120 due to its position above file-based write filter 110 in the device stack.

Figure 4C:
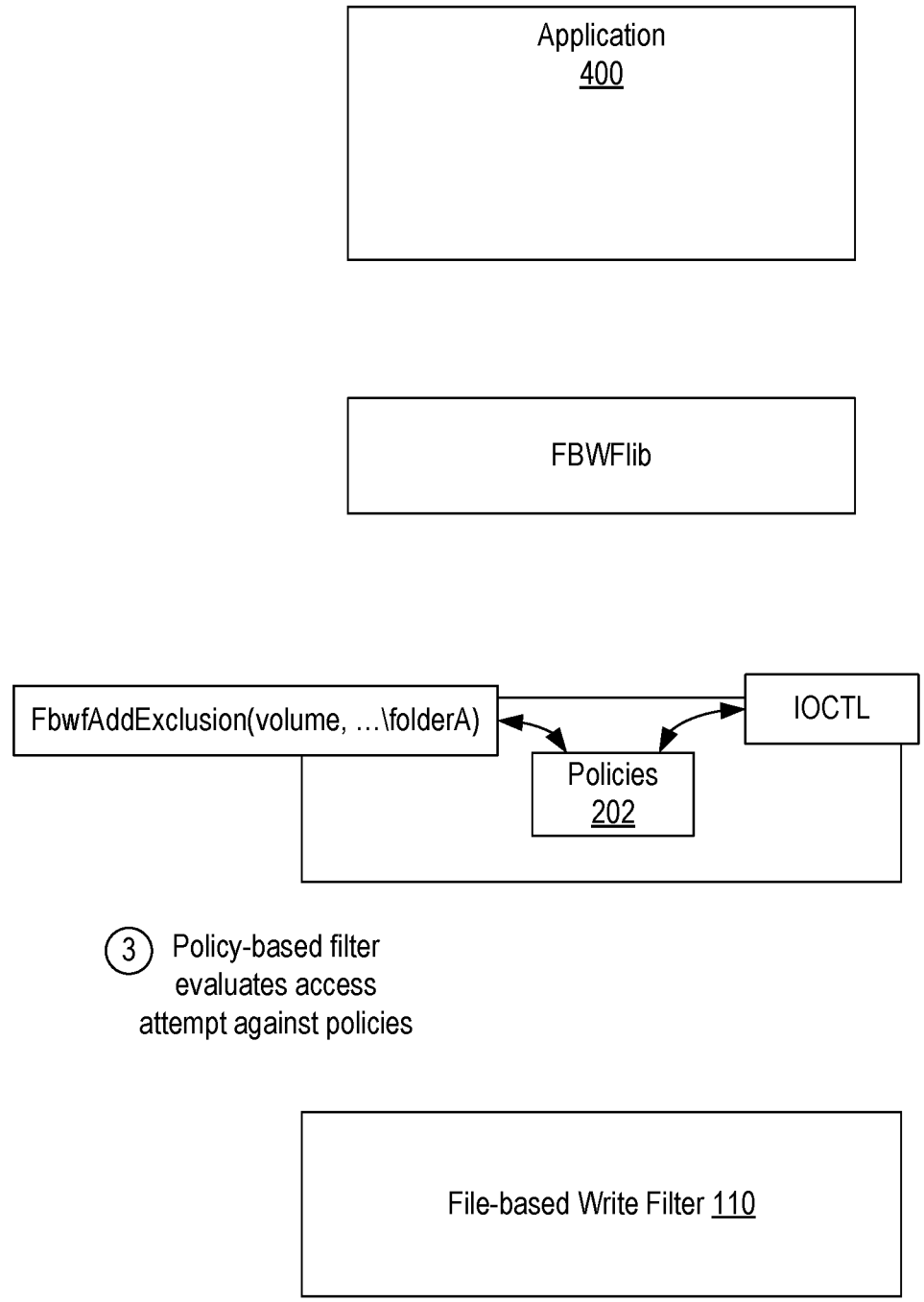

In response to intercepting the attempt to access the functionality of file-based write filter 110, policy-based filter 200 can evaluate the access attempt against policies 202 as represented as step 3 in FIG. 4C. In the case of API hooking, the fact that policy-based filter 200 has intercepted a call implies that an attempt to access functionality of file-based write filter has occurred (e.g., policy-based filter 200 can only hook API calls that can be used to access the functionality improperly). In contrast, in the case of IOCTL filtering, it may be necessary to examine the context of the IOCTL to determine whether it targets a functionality of file-based write filter 110 that should be secured. For example, policy-based filter 200 may not be concerned with calls to the FbwfFindFirst function (which can be used to see what files are in overlay 140) and may therefore not evaluate such an IOCTL against policies 202 but may always evaluate an IOCTL pertaining to the FbwfDisableFilter function against policies 202. Accordingly, in some cases, step 3 can involve determining whether the access attempt is a type of access attempt that should be evaluated.

Step 3 can also include evaluating the access attempt to determine the application and or user that is the source of the access attempt. Any suitable technique for determining the source application and source user can be employed. For example, policy-based filter 200 could employ the PsGetCurrentProcessID function to obtain the ProcessID associated with the IOCTL or hooked call and then use the ProcessID as an input to the ZwQueryInformationProcess function to retrieve information about the source application, and could use the GetUserName function to obtain the username of the current user.

Regardless of how the source application and/or user are identified, policy-based filter 200 can access policies 202 to determine whether the particular application and/or the particular user are authorized to access the particular functionality of file-based write filter 110. In the context of the present example, policy-based filter 200 may determine whether policies 202 include any rules that would allow application 400 and/or the current user to invoke the FbwfAddExclusion function.

Figure 4D:
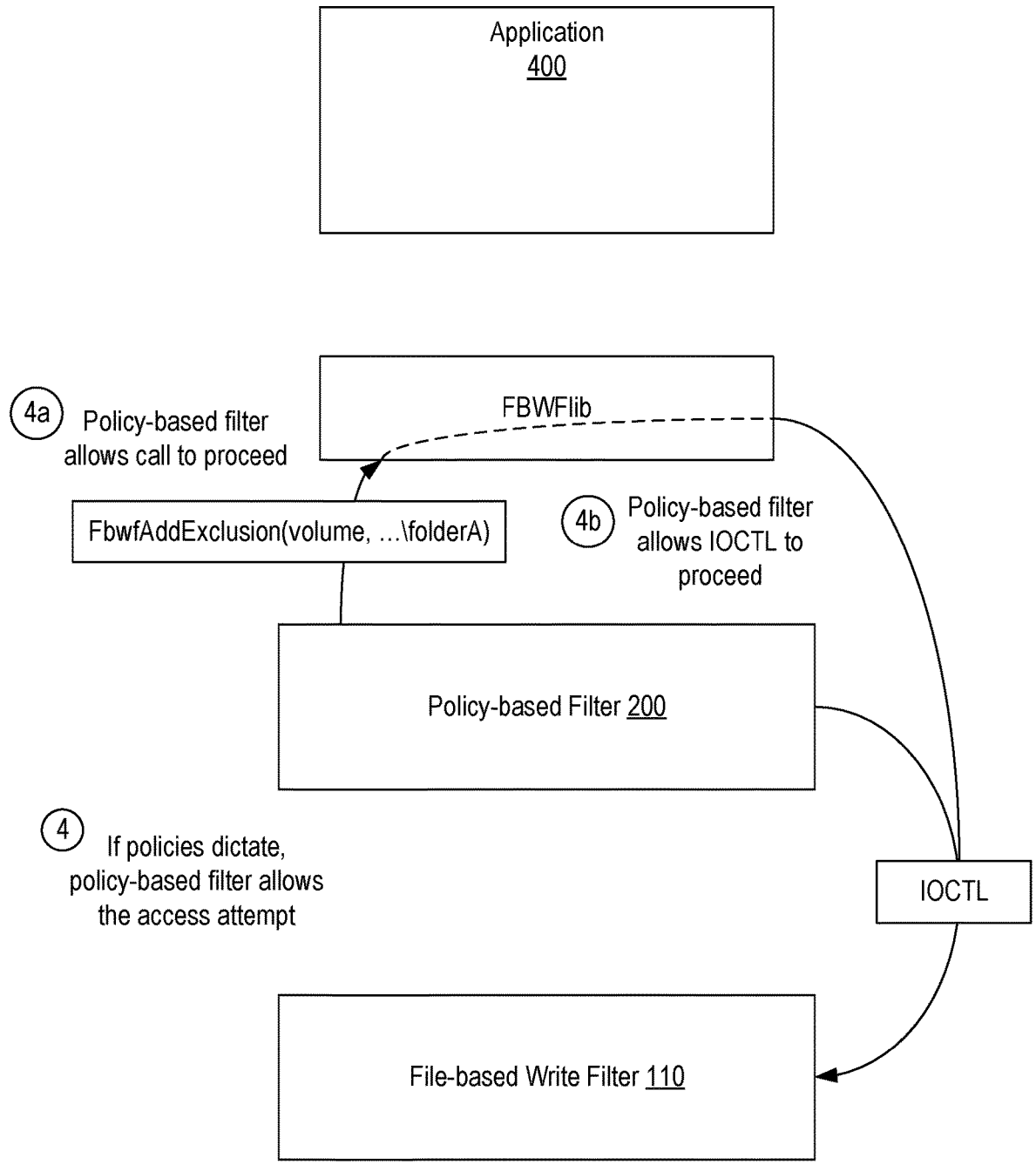

Assuming policies 202 include a rule that would allow application 400 and/or the current user to add exclusions (or, in the case of a blacklist, do not include a rule that would deny such access), policy-based filter 200 can allow the access attempt to proceed as represented as step 4 in FIG. 4D. In the case of API hooking, this may entail allowing the call to the FbwfAddExclusion function to proceed in a normal fashion to the FBWFlib component which would then create the appropriate IOCTL (e.g., via the DeviceIoControl function) to be passed on to file-based write filter 110 as represented in step 4a. In the case of IOCTL filtering, this may entail passing the IOCTL down the device stack to file-based write filter as represented in step 4b.

Figure 4E:
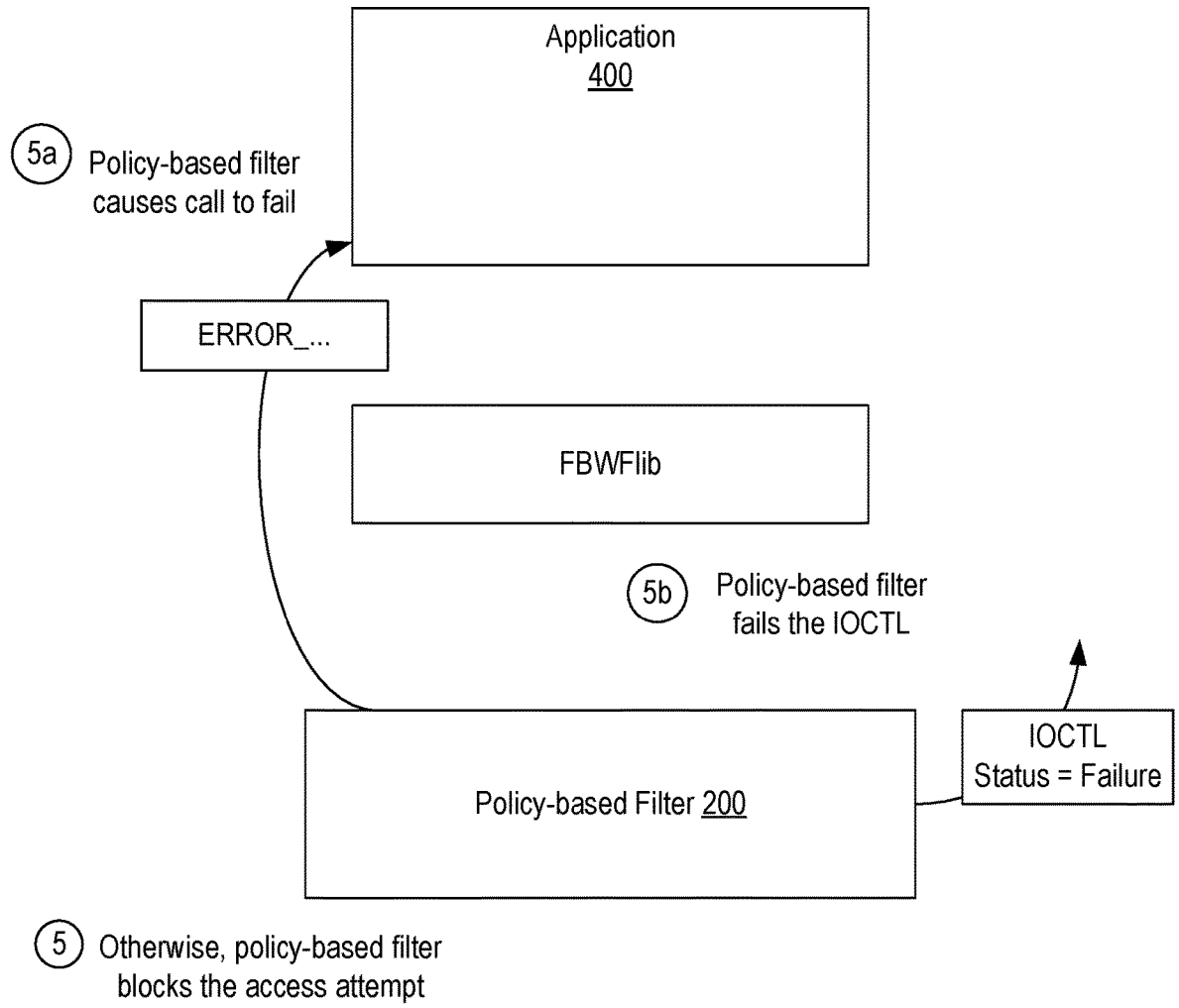
Figure 4E:
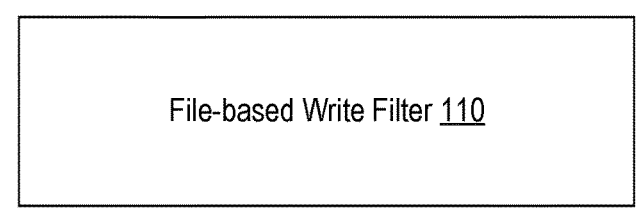

In contrast, assuming policies 202 would not allow this access attempt, policy-based filter 200 would block the attempt as represented in step 5 in FIG. 4E. In the case of API hooking, this may entail causing the FbwfAddExclusion function to be immediately returned with an ERROR value or otherwise preventing its successful completion as represented in step 5a. In the case of IOCTL filtering, this may entail completing the IOCTL with a failure status to thereby prevent I/O manager 120 from passing the IOCTL down to file-based write filter 110.

FIGS. 4A-4E represent an example where policy-based filter 200 makes decisions on whether to allow an attempt to access the functionality of file-based write filter 110 using only the content of policies 202. However, as indicated above, in some embodiments, policy-based filter 200 can be configured to base such decisions on information obtained in real-time from a server component such as a management service. In such cases, policy-based filter 200 can communicate with agent 210 which can in turn communicate with the server component. A primary reason for performing these "on-demand" communications is to allow an administrator to define access windows during which the functionality of file-base write filter 110 can be modified. For example, in addition to employing policies 202 to define which applications and/or users can access the functionality of file-based write filter 110, an administrator can specify time periods or "access windows" during which this policy-approved access can be made. In this way, an administrator can block all attempts to modify the functionality of file-base write filter 110 that are made outside of a specified access window.

Figure 5:
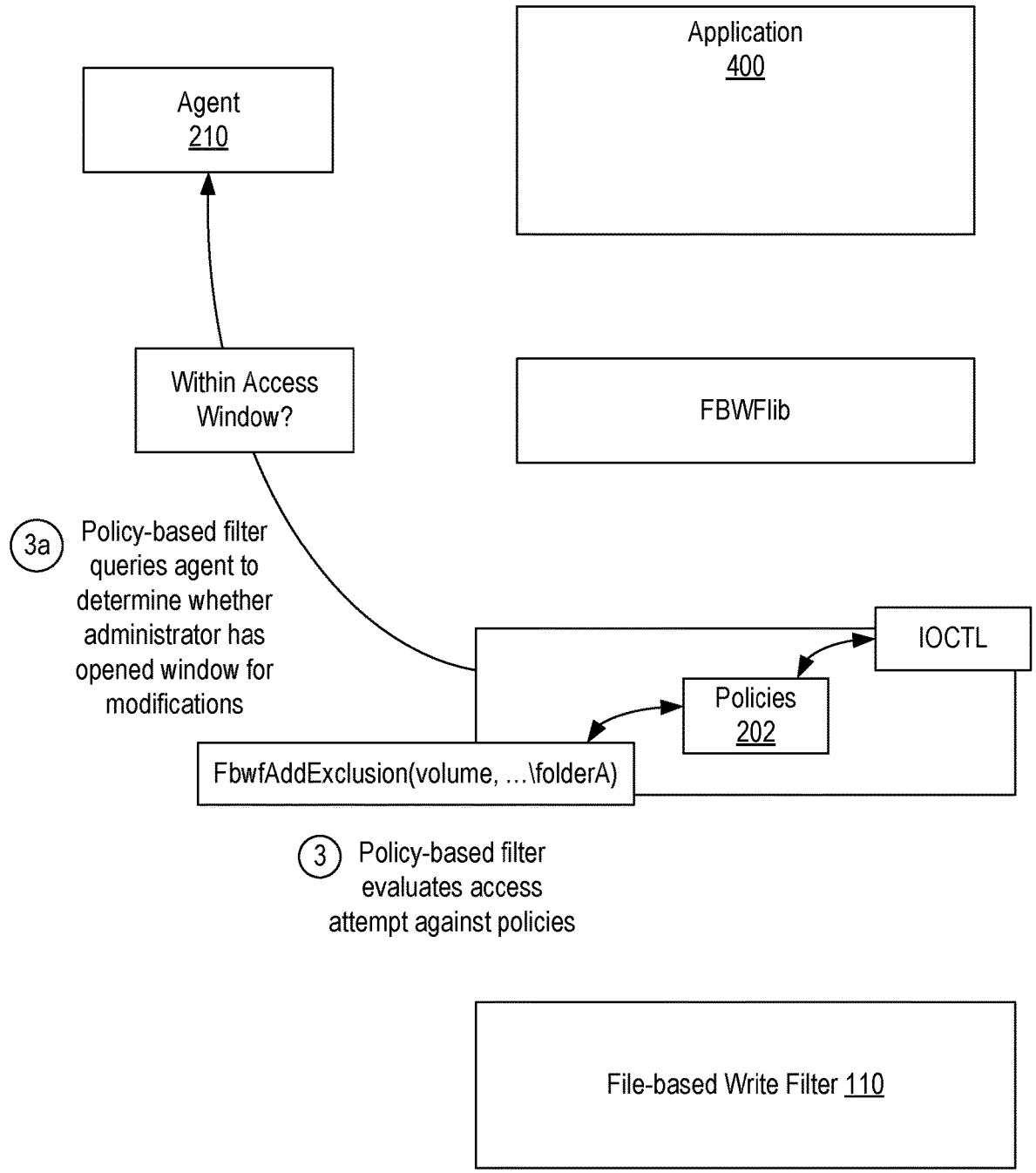
FIG. 5 illustrates how the policy-based filter can interface with a server-based management solution for purposes of determining whether an attempt to access functionality of the file-based write filter should be allowed.

FIG. 5, which is based on FIG. 4C, illustrates an example of how policy-based filter 200 may communicate with agent 210 as part of evaluating an access attempt against policies 202 in step 3. As shown in step 3a, upon intercepting an access attempt, policy-based filter 200 can query agent 210 to determine whether an access window for modifying the functionality of file-based write filter 110 has been opened. Although not shown, agent 210 can respond to this query by communicating with a server component to determine whether the administrator has opened an access window. Alternatively, whenever the administrator opens an access window, the server component can notify agent 210 so that agent 210 will not need to perform network communications when it receives the query from policy-based filter 200. In any case, the server component can inform agent 210 when an administrator has opened an access window for modifying the functionality of file-based filter 110 so that agent 210 can in turn notify policy-based filter 200. Policy-based filter 200 can then only allow an access attempt if it occurs while the access window is open.

As one practical example, an administrator may open an access window when it is known that a legitimate modification needs to be made to the functionality of file-based write filter 110 such as may be the case when an update to the operating system image is scheduled for deployment. Similarly, if one administrator is working on a particular computing device and needs to modify the operating system image, the administrator can request that an access window be opened to allow the modification on that particular computing device.

By using these access windows, even if a malicious application and/or user happened to find a way to bypass policies 202, the application and/or user still would not be able to modify the functionality of file-based write filter 110 unless an attempt was made while an access window is open. Given that access windows may only be opened infrequently, this would be an unlikely occurrence.

Although the figures depict that policy-based filter 200 directly maintains policies 202, it is equally possible that agent 210 maintains policies 202. In such cases, policy-based filter 200 would communicate with agent 210 each time it is necessary to evaluate whether an application and/or user is authorized for a particular access attempt. Also, as mentioned above, the server component may communicate with agent 210 for the purpose of updating policies 202. Accordingly, the location where policies 202 are actually stored is not essential to the invention.

Figure 6:
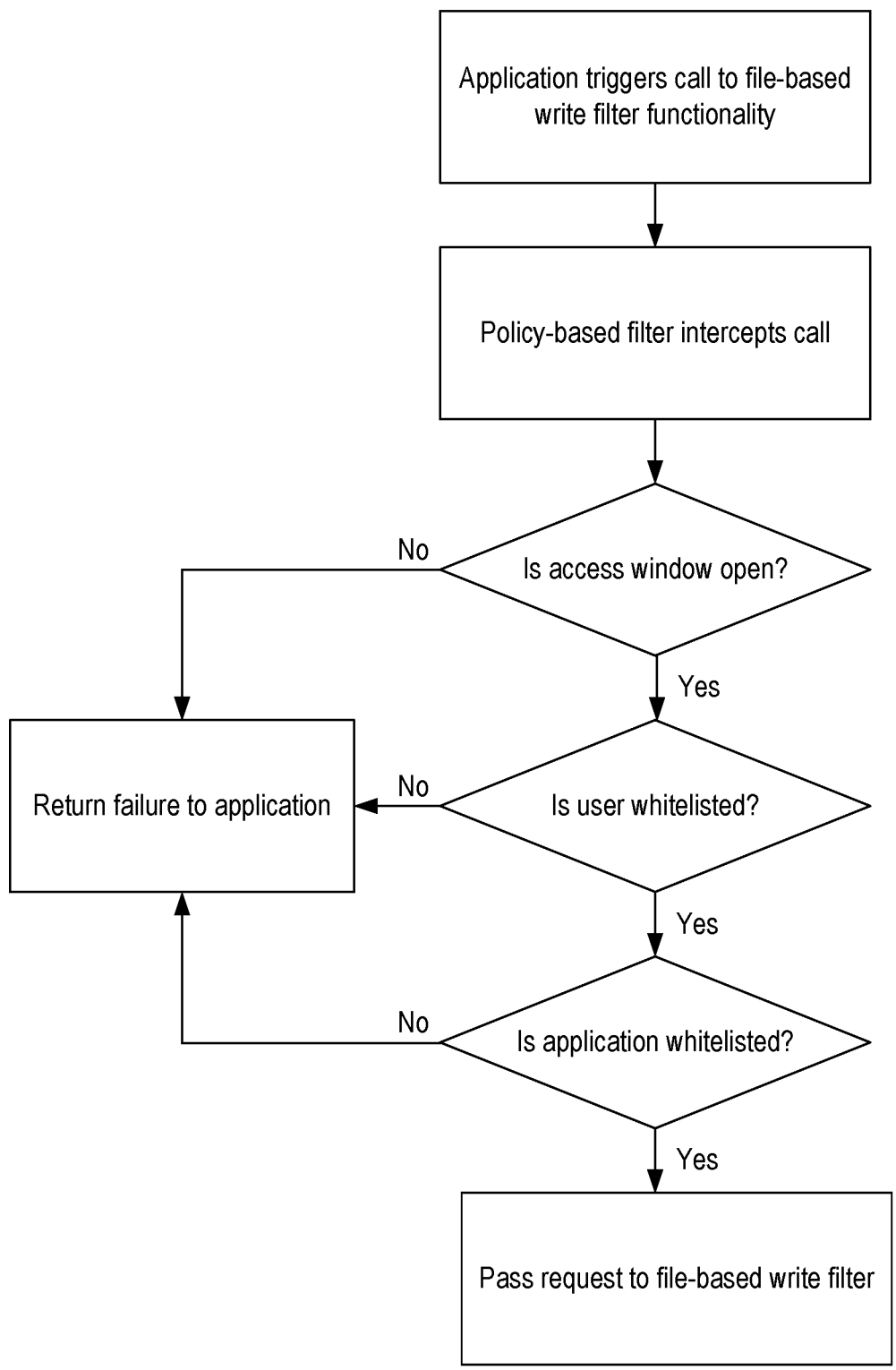
FIG. 6 provides a flow diagram of the steps that the policy-based filter can perform when an attempt is made to access the functionality of the file-based write filter.

FIG. 6 provides a flow diagram that summarizes how the present invention may be implemented in some embodiments. Whenever an application triggers a call to functionality of file-based write filter 110, policy-based filter 200 can intercept the call in a suitable manner. Policy-based filter 200 can then determine whether an access window is open, and, if not, return a failure to the application. If an access window is open, policy-based filter 200 can then determine if the current user is whitelisted, and, if not, return a failure to the application. If the user is whitelisted, policy-based filter 200 can then determine if the application is whitelisted, and, if not, return a failure. However, if the application is whitelisted, policy-based filter 200 may pass the request to file-based write filter 110 to allow its functionality to be modified. Of course, these three determinations could be performed in a different order.

In summary, policy-based filter 200 can be employed to control access to the functionality of file-based write filter 110 to thereby increase the security of a protected volume. Policy-based filter 200 can function independently in some embodiments or in conjunction with a server-based management solution in other embodiments to perform this functionality. An administrator can therefore have greater ability to protect an operating system image from unwanted modification.

Figure 7:
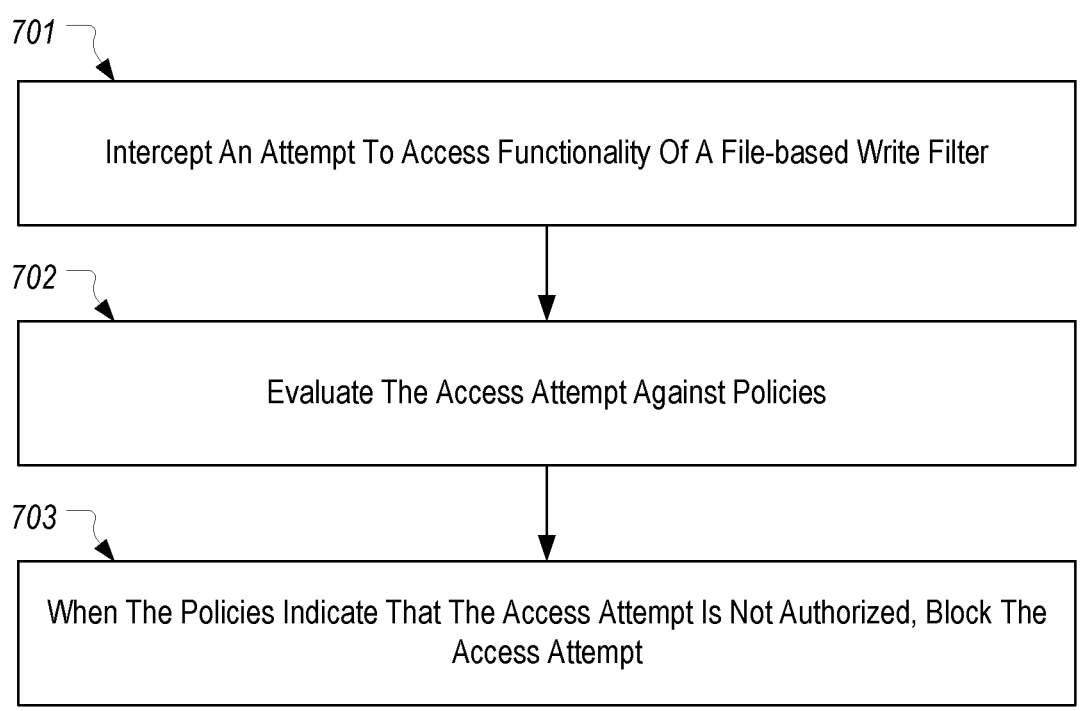
FIG. 7 provides a flowchart of an example method for securing access to functionality of a file-based write filter.

FIG. 7 provides a flowchart of an example method 700 for securing access to functionality of a file-based write filter. Method 700 can be implemented by policy-based filter 200.

Method 700 includes an act 701 of intercepting an attempt to access functionality of a file-based write filter. For example, policy-based filter 200 can hook a call to a function of write filter APIs 150 or can receive an IOCTL directed to file-based write filter 110.

Method 700 includes an act 702 of evaluating the access attempt against policies. For example, policy-based filter 200 can determine an application and/or user that is attempting the access and can determine whether policies 202 indicate that the application and/or user are allowed to perform the access.

Method 700 includes an act 703 of blocking the access attempt when the policies indicate that the access attempt is not authorized. For example, policy-based filter 200 can cause a function call to be returned with a failure or can complete an IOCTL with a failure status to thereby prevent the attempt from reaching file-based write filter 110.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a policy-based filter that executes on a computing device as an intermediary between a file-based write filter and a write filter application programming interface (API) that applications employ to access functionality of the file-based write filter, for securing access to functionality of the file-based write filter, the method comprising:
   in response to an application employing the write filter API to submit a request to add an artifact to an exclusion list of the file-based write filter to thereby cause the file-based write filter to allow Input/Output (I/O) requests that target the artifact to be directed to a protected volume, intercepting, by the policy-based filter, the request to add the artifact to the exclusion list before the request to add the artifact to the exclusion list is passed to the file-based write filter;
   evaluating, by the policy-based filter, the request to add the artifact to the exclusion list against policies; and
   when the policies indicate that the request to add the artifact to the exclusion list is not authorized, blocking, by the policy-based filter, the request to add the artifact to the exclusion list so that the request to add the artifact to the exclusion list is not passed to the file-based write filter thereby causing the file-based write filter to redirect I/O requests that target the artifact so that the I/O requests are not directed to the protected volume, whereas when the policies indicate that the request to add the artifact to the exclusion list is authorized, allowing, by the policy-based filter, the request to add the artifact to the exclusion list so that the request to add the artifact to the exclusion list is passed to the file-based write filter thereby causing the file-based write filter to allow I/O requests that target the artifact to be directed to the protected volume.

2. The method of claim 1, wherein intercepting the request to add the artifact to the exclusion list comprises hooking a call to a function of the write filter API.

3. The method of claim 1, wherein intercepting the request to add the artifact to the exclusion list comprises employing a filter driver to receive an input/output control (IOCTL) targeting the file-based write filter that was generated in response to the application employing the write filter API to submit the request to add the artifact to the exclusion list.

4. The method of claim 1, wherein evaluating the request to add the artifact to the exclusion list against policies comprises determining whether the application is permitted to add exclusions to the exclusion list.

5. The method of claim 1, wherein evaluating the request to add the artifact to the exclusion list against policies comprises determining whether a current user is permitted to add exclusions to the exclusion list.

6. The method of claim 1, wherein evaluating the request to add the artifact to the exclusion list against policies comprises determining whether an access window is open.

7. The method of claim 6, wherein determining whether an access window is open comprises communicating with an agent.

8. The method of claim 7, wherein the agent communicates with a server-based component to determine whether an administrator has opened an access window.

9. The method of claim 1, further comprising:
   intercepting, by the policy-based filter, a request to persist an artifact stored in an overlay to the protected volume before the request to persist the artifact stored in the overlay to the protected volume is passed to the file-based write filter;
   evaluating, by the policy-based filter, the request to persist the artifact stored in the overlay to the protected volume against policies; and
   when the policies indicate that the request to persist the artifact stored in the overlay to the protected volume is not authorized, blocking, by the policy-based filter, the request to persist the artifact stored in the overlay to the protected volume so that the request to persist the artifact stored in the overlay to the protected volume is not passed to the file-based write filter thereby causing the file-based write filter to retain the artifact in the overlay and to continue redirecting I/O requests that target the artifact so that the I/O requests are directed to the overlay rather than to the protected volume, whereas when the policies indicate that the request to persist the artifact stored in the overlay to the protected volume is authorized, allowing, by the policy-based filter, the request to persist the artifact stored in the overlay to the protected volume so that the request to persist the artifact stored in the overlay to the protected volume is passed to the file-based write filter thereby causing the file-based write filter to persist the artifact to the protected volume.

10. The method of claim 1, further comprising:
    intercepting, by the policy-based filter, a request to disable the file-based write filter before the request to disable the file-based write filter is passed to the file-based write filter;
    evaluating, by the policy-based filter, the request to disable the file-based write filter against policies; and
    when the policies indicate that the request to disable the file-based write filter is not authorized, blocking, by the policy-based filter, the request to disable the file-based write filter so that the request to disable the file-based write filter is not passed to the file-based write filter thereby causing the file-based write filter to remain enabled, whereas when the policies indicate that the request to disable the file-based write filter is authorized, allowing, by the policy-based filter, the request to disable the file-based write filter so that the request to disable the file-based write filter is passed to the file-based write filter thereby causing the file-based write filter to be disabled.

11. The method of claim 1, further comprising:
    intercepting, by the policy-based filter, a request to disable write filtering for a particular volume before the request to disable write filtering for the particular volume is passed to the file-based write filter;

evaluating, by the policy-based filter, the request to disable write filtering for the particular volume against policies; and when the policies indicate that the request to disable write filtering for the particular volume is not authorized, blocking, by the policy-based filter, the request to disable write filtering for the particular volume so that the request to disable write filtering for the particular volume is not passed to the file-based write filter thereby causing the file-based write filter to continue performing write filtering for the particular volume, whereas when the policies indicate that the request to disable write filtering for the particular volume is authorized, allowing, by the policy-based filter, the request to disable write filtering for the particular volume so that the request to disable write filtering for the particular volume is passed to the file-based write filter thereby causing the file-based write filter to disable write filtering for the particular volume.

12. A method, implemented by a policy-based filter that executes on a computing device as an intermediary between a file-based write filter and a write filter application programming interface (API) that applications employ to access functionality of the file-based write filter, for securing access to functionality of the file-based write filter, the method comprising:

in response to an application employing the write filter API to submit a request to persist an artifact stored in an overlay to a protected volume, intercepting, by the policy-based filter, the request to persist the artifact stored in the overlay to the protected volume before the request to persist the artifact stored in the overlay to the protected volume is passed to the file-based write filter;

evaluating, by the policy-based filter, the request to persist the artifact stored in the overlay to the protected volume against policies; and when the policies indicate that the request to persist the artifact stored in the overlay to the protected volume is not authorized, blocking, by the policy-based filter, the request to persist the artifact stored in the overlay to the protected volume so that the request to persist the artifact stored in the overlay to the protected volume is not passed to the file-based write filter thereby causing the file-based write filter to retain the artifact in the overlay and to continue redirecting Input/Output (I/O) requests that target the artifact so that the I/O requests are directed to the overlay rather than to the protected volume, whereas when the policies indicate that the request to persist the artifact stored in the overlay to the protected volume is authorized, allowing, by the policy-based filter, the request to persist the artifact stored in the overlay to the protected volume so that the request to persist the artifact stored in the overlay to the protected volume is passed to the file-based write filter thereby causing the file-based write filter to persist the artifact to the protected volume.

13. The method of claim 12, wherein intercepting the request to persist the artifact stored in the overlay to the protected volume comprises one or both of:

hooking a call to a function of the write filter API; or employing a filter driver to receive an input/output control (IOCTL) targeting the file-based write filter that was generated in response to the application employing the write filter API to submit the request to persist the artifact stored in the overlay to the protected volume.

14. The method of claim 12, wherein evaluating the request to persist the artifact stored in the overlay to the protected volume against policies comprises one or more of:

determining whether the application is permitted to persist artifacts stored in the overlay to the protected volume;

determining whether a current user is permitted to persist artifacts stored in the overlay to the protected volume; or determining whether an access window is open.

15. The method of claim 12, wherein evaluating the request to persist the artifact stored in the overlay to the protected volume against policies comprises:

determining whether the application is permitted to persist artifacts stored in the overlay to the protected volume;

determining whether a current user is permitted to persist artifacts stored in the overlay to the protected volume; and determining whether an access window is open.

16. A method, implemented by a policy-based filter that executes on a computing device as an intermediary between a file-based write filter and a write filter application programming interface (API) that applications employ to access functionality of the file-based write filter, for securing access to functionality of the file-based write filter, the method comprising:

in response to an application employing the write filter API to submit a request to disable the file-based write filter, intercepting, by the policy-based filter, the request to disable the file-based write filter before the request to disable the file-based write filter is passed to the file-based write filter;

evaluating, by the policy-based filter, the request to disable the file-based write filter against policies; and when the policies indicate that the request to disable the file-based write filter is not authorized, blocking, by the policy-based filter, the request to disable the file-based write filter so that the request to disable the file-based write filter is not passed to the file-based write filter thereby causing the file-based write filter to remain enabled, whereas when the policies indicate that the request to disable the file-based write filter is authorized, allowing, by the policy-based filter, the request to disable the file-based write filter so that the request to disable the file-based write filter is passed to the file-based write filter thereby causing the file-based write filter to be disabled.

17. The method of claim 16, wherein the request to disable the file-based write filter comprises a request to disable write filtering for a particular volume such that when the policies indicate that the request to disable write filtering for the particular volume is not authorized, the policy-based filter blocks the request to disable write filtering for the particular volume so that the request to disable write filtering for the particular volume is not passed to the file-based write filter thereby causing the file-based write filter to continue performing write filtering for the particular volume, whereas when the policies indicate that the request to disable write filtering for the particular volume is authorized, the policy-based filter allows the request to disable write filtering for the particular volume so that the request to disable write filtering for the particular volume is passed to the file-based write filter thereby causing the file-based write filter to disable write filtering for the particular volume.

18. The method of claim 16, wherein intercepting the request to disable the file-based write filter comprises one or both of:

hooking a call to a function of the write filter API; or employing a filter driver to receive an input/output control (IOCTL) targeting the file-based write filter that was generated in response to the application employing the write filter API to submit the request to disable the file-based write filter.

19. The method of claim 16, wherein evaluating the request to disable the file-based write filter against policies comprises one or more of:
   determining whether the application is permitted to disable the file-based write filter;
   determining whether a current user is permitted to disable the file-based write filter; or
   determining whether an access window is open.

20. The method of claim 16, wherein evaluating the request to disable the file-based write filter against policies comprises:
   determining whether the application is permitted to disable the file-based write filter;
   determining whether a current user is permitted to disable the file-based write filter; and
   determining whether an access window is open.

* * * * *